(12) United States Patent
Agrawal et al.

(10) Patent No.: US 11,192,023 B2
(45) Date of Patent: *Dec. 7, 2021

(54) SYSTEMS AND METHODS OF AUTOMATIC GAME CREATION

(71) Applicant: Zynga Inc., San Francisco, CA (US)

(72) Inventors: Abhinav Agrawal, San Francisco, CA (US); Adam Ja Ming Yim, San Francisco, CA (US); Kohta Aoki Wajima, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/834,629

(22) Filed: Mar. 30, 2020

(65) Prior Publication Data

US 2020/0222801 A1    Jul. 16, 2020

Related U.S. Application Data

(63) Continuation of application No. 16/156,443, filed on Oct. 10, 2018, now Pat. No. 10,682,571, which is a continuation of application No. 14/688,660, filed on Apr. 16, 2015, now Pat. No. 10,124,253.

(Continued)

(51) Int. Cl.
*A63F 13/30* (2014.01)
*A63F 13/63* (2014.01)
*A63F 13/795* (2014.01)

(52) U.S. Cl.
CPC .............. *A63F 13/30* (2014.09); *A63F 13/63* (2014.09); *A63F 13/795* (2014.09)

(58) Field of Classification Search
USPC .......................................................... 463/42
See application file for complete search history.

(56) References Cited

U.S. PATENT DOCUMENTS 7,828,661 B1    11/2010  Fish et al.
8,246,466 B2 *   8/2012  Herrmann .............. G07F 17/32
                                                         463/42

(Continued)

FOREIGN PATENT DOCUMENTS

WO    WO-2015161077 A1    10/2015

OTHER PUBLICATIONS

U.S. Appl. No. 14/688,660, U.S. Pat. No. 10,124,253, filed Apr. 16, 2015 Systems and Methods of Automatic Game Creation.

(Continued)

*Primary Examiner* — Pierre E Elisca
(74) *Attorney, Agent, or Firm* — Schwegman Lundberg & Woessner, P.A.

(57) ABSTRACT

A system, machine-readable storage medium storing at least one program, and a computer-implemented method for automatic game creation are presented. An access module can access player information for a receiver and an originator. Additionally, a matching module can determine that the receiver and the originator have a connection based on the player information. Furthermore, a game invitation module can detect that a recipient game is installed on an originator device of the originator and that the recipient game is not installed on a receiver device of the receiver. Subsequently, the game invitation module can send, to the receiver device, a game invitation to play the recipient game based on the determination and the detection, with the game invitation including information associated with the originator.

20 Claims, 9 Drawing Sheets

Related U.S. Application Data

(60) Provisional application No. 61/980,236, filed on Apr. 16, 2014.

(56) References Cited

U.S. PATENT DOCUMENTS

| | | | | |
|---|---|---|---|---|
| 9,155,965 | B2* | 10/2015 | Wickett | G07F 17/32 |
| 9,317,993 | B2* | 4/2016 | Hardy | G07F 17/32 |
| 9,919,207 | B2* | 3/2018 | Brenden | H04L 51/32 |
| 2006/0121990 | A1 | 6/2006 | O'Kelley, II et al. | |
| 2009/0176560 | A1* | 7/2009 | Herrmann | A63F 9/24 463/25 |
| 2009/0176580 | A1* | 7/2009 | Herrmann | G06F 17/00 463/43 |
| 2012/0227035 | A1 | 9/2012 | Obasanjo et al. | |
| 2013/0254192 | A1 | 9/2013 | Work et al. | |
| 2014/0006517 | A1 | 1/2014 | Hsiao et al. | |
| 2014/0128138 | A1* | 5/2014 | Wickett | G07F 17/3237 463/13 |
| 2015/0298007 | A1 | 10/2015 | Agrawal et al. | |
| 2019/0038972 | A1 | 2/2019 | Agrawal et al. | |

OTHER PUBLICATIONS

U.S. Appl. No. 16/156,443, filed Oct. 10, 2018 Systems and Methods of Automatic Game Creation.

"U.S. Appl. No. 14/688,660, Corrected Notice of Allowability dated Jul. 27, 2018", 2 pgs.

"U.S. Appl. No. 14/688,660, First Action Interview—Pre-Interview Communication dated Sep. 14, 2017", 3 pgs.

"U.S. Appl. No. 14/688,660, Non Final Office Action dated Jan. 16, 2018", 10 pgs.

"U.S. Appl. No. 14/688,660, Notice of Allowance dated Jul. 13, 2018", 9 pgs.

"U.S. Appl. No. 14/688,660, Response filed May 16, 2018 to Non Final Office Action dated Jan. 16, 2018", 10 pgs.

"U.S. Appl. No. 16/156,443, Non Final Office Action dated Oct. 15, 2019", 6 pgs.

"U.S. Appl. No. 16/156,443, Notice of Allowance dated Feb. 5, 2020", 9 pgs.

"U.S. Appl. No. 16/156,443, Response filed Jan. 15, 2020 to Non Final Office Action dated Oct. 15, 2019", 9 pgs.

"International Application Serial No. PCT/US2015/026173, International Preliminary Report on Patentability dated Oct. 27, 2016", 11 pgs.

"International Application Serial No. PCT/US2015/026173, International Search Report dated Jul. 10, 2015", 2 pgs.

"International Application Serial No. PCT/US2015/026173, Written Opinion dated Jul. 10, 2015", 9 pgs.

\* cited by examiner

SYSTEMS AND METHODS OF AUTOMATIC GAME CREATION

CROSS-REFERENCE TO RELATED APPLICATIONS

This application is a continuation of U.S. patent application Ser. No. 16/156,443, filed Oct. 10, 2018, now issued as U.S. patent Ser. No. 10/682,571, which is a continuation of U.S. patent application Ser. No. 14/688,660, filed on Apr. 16, 2015, now issued as U.S. Pat. No. 10,124,253, which claims the benefit of priority to U.S. Provisional Application Ser. No. 61/980,236, filed on Apr. 16, 2014, the contents of each of which are hereby incorporated herein by reference in their entireties.

TECHNICAL FIELD

The present disclosure relates to games and applications in general and in particular to computer-implemented games. In an example embodiment, an invitation to play an automatically-created game is sent to a player.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, and Internet Explorer).

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

In various example embodiments, a game networking system associated with one or more computer-implemented virtual games can host a social, asynchronous game that automatically matches players with each other for game play. The game networking system can include a game invitation module. In some instances, the game invitation module automatically generates and sends a game invitation to a player, also referred to as a receiver. The invitation can appear to have been initiated by an originator, who can be a friend within the receiver's social network (e.g. Twitter, Facebook, Google, Zynga, etc.).

For example, the game invitation is automatically initiated and generated by the game invitation module without the originator actually initiating the invitation. If the receiver accepts the invitation to play with the originator, the game invitation module can automatically send a subsequent invitation to the originator such that it appears that the receiver is initiating game play with the originator. These techniques allow for the creation of game play between two players without either player initiating the game instance, resulting in increased player retention and engagement.

A game invitation module can improve new user retention by providing more games to users. For example, a user may not have enough friends in a social network playing the game or may be slow in creating new games.

In some instances, a new game installation is created automatically once the receiver accepts the game invitation. The game invitation can include a link to an application store to download the game application. Once the game has been installed, a game instance of the game can be initiated by the game invitation module. Additionally, the game invitation module can send a turn notification to the receiver so that the receiver plays first. For example, the turn notification can appear in the receiver's moves list. Additionally, the game instance and turn notification may not appear in the originator's moves list until the receiver has played his/her turn.

An example of a turn notification includes a push notification to a receiver with the following example text: "Someone just started a game with you—play your turn now!" Additionally, the turn notification can be customize by including the name of the originator, such as "<Person name> has invited you to play!"

Additionally, game instances can be created automatically for users connected in a social network or users connected based on similar characteristics stored in the game server. For example, the first game instance can be created shortly after the game has been installed by the receiver (e.g., within the first hour of installing the game, within the first day of installing the game).

Example System

Figure 1:
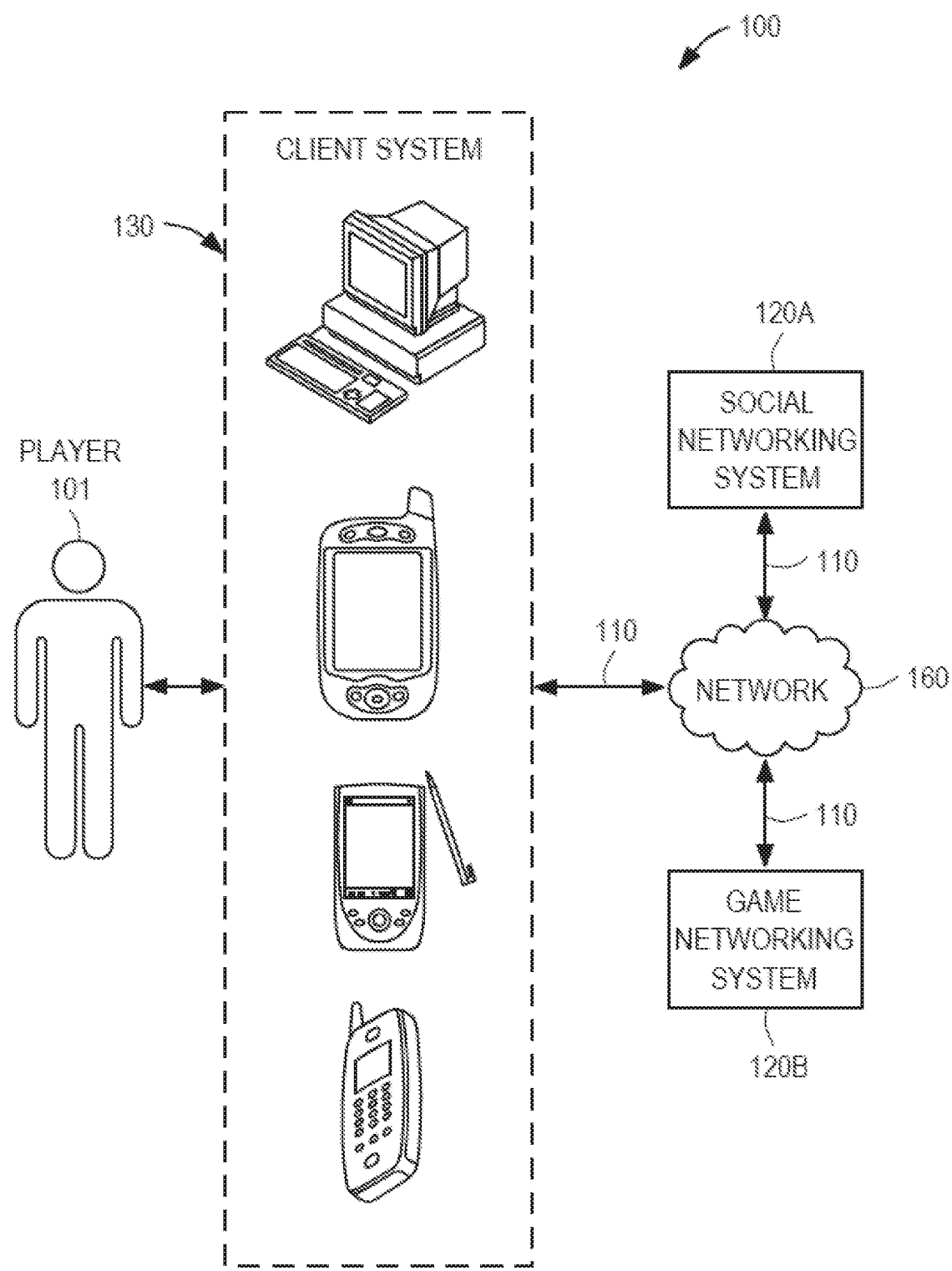
FIG. 1 is a schematic diagram showing an example of a system, according to some example embodiments.

FIG. 1 illustrates an example of a system for implementing various disclosed embodiments. In particular embodiments, system 100 comprises player 101, social networking system 120*a*, game networking system 120*b*, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social network system 120*a* is a network-addressable computing system that can host one or more social graphs. Social networking system 120*a* can generate, store, receive, and transmit social networking data. Social network system 120*a* can be accessed by the other components of system 100 either directly or via network 160. Game networking system 120*b* is a network-addressable computing system that can host one or more online games. Game networking system 120*b* can generate, store, receive, and transmit game-related data, such as, for example, game account data, game input, game state data, and game displays. Game networking system 120*b* can be accesses by the other components of system 100 either directly or via network 160. Player 101 may use client system 130 to access, send data to, and receive data from social network system 120*a* and game networking system 120*b*. Client system 130 can access social networking system 120 or game networking system 120*b* directly, via network 160, or via a third-party system. As an example and not by way of limitation, client system 130 may access game networking system 120*b* via social networking system 120*a*. Client system 130 can be any suitable computing device, such as a personal computer, laptop, cellular phone, smart phone, computing tablet, etc.

Although FIG. 1 illustrates a particular number of players 101, social network systems 120*a*, game networking systems 120*b*, client systems 130, and networks 160, this disclosure contemplates any suitable number of players 101, social network systems 120*a*, game networking systems 120*b*, client systems 130, and networks 160. As an example and not by way of limitation, system 100 may include one or more game networking systems 120*b* and no social networking systems 120*a*. As another example and not by way of limitation, system 100 may include a system that comprises both social networking system 120*a* and game networking system 120*b*. Moreover, although FIG. 1 illustrates a particular arrangement of player 101, social network system 120*a*, game networking system 120*b*, client system 130, and network 160, this disclosure contemplates any suitable arrangement of player 101, social network system 120*a*, game networking system 120*b*, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social network system 120*a*, game networking system 120*b*, client system 130, and network 160, this disclosure contemplates any suitable connections between player 101, social network system 120*a*, game networking system 120*b*, client system 130, and network 160. As an example and not by way of limitation, in particular embodiments, client system 130 may have a direct connection to social network system 120*a* or game networking system 120*b*, bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120*b*, which can be accessed using any suitable connection with a suitable client system 130. A player may have a game account on game networking system 120*b*, wherein the game account can contain a variety of information associated with the player (e.g., the player's personal information, financial information, purchase history, player character state, game state). In some embodiments, a player may play multiple games on game networking system 120*b*, which may maintain a single game account for the player with respect to all the games, or multiple individual game accounts for each game with respect to the player. In some embodiments, game networking system 120*b* can assign a unique identifier to each player 101 of an online game hosted on game networking system 120*b*. Game networking system 120*b* can determine that a player 101 is accessing the online game by reading the user's cookies, which may be appended to HTTP requests transmitted by client system 130, and/or by the player 101 logging onto the online game.

An online game can be hosted by game networking system 120*b*, which can be accessed using any suitable connection with a suitable client system 130. A player may have a game account on game networking system 120*b*, wherein the game account can contain a variety of information associated with the player (e.g., the player's personal information, financial information, purchase history, player character state, game state). In some embodiments, a player may play multiple games on game networking system 120*b*, which may maintain a single game account for the player with respect to all the games, or multiple individual game accounts for each game with respect to the player. In some embodiments, game networking system 120*b* can assign a unique identifier to each player 101 of an online game hosted on game networking system 120b. Game networking system 120b can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

Game Systems, Social Networks, and Social Graphs

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120a or game networking system 120b). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
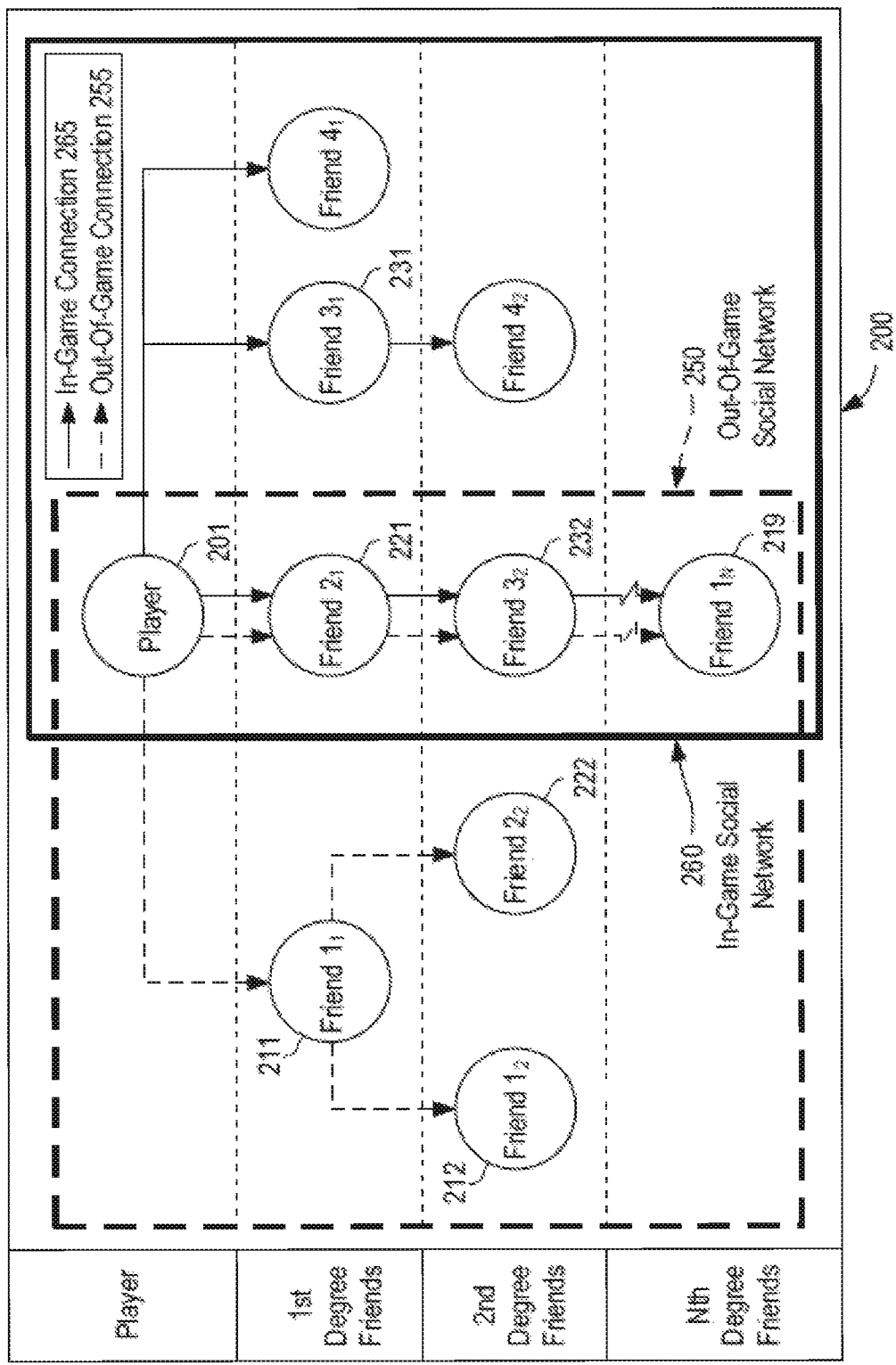
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, the direct connection is referred to as a first-degree friend. In social network 250, Player 201 has two first-degree friends. That is, Player 201 is directly connected to Friend 11 211 and Friend 21 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend 12 212 and Friend 22 222 are connected to Player 201 via his first-degree Friend 11 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend 1N 219 is connected to Player 201 via second-degree Friend 32 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend 11 211 and Friend 21 221 are first-degree friends with Player 201 in his out-of-game social network 250. Player 201 also has in-game connections 265 to a plurality of players, forming in-game social network 260. Here, Friend 21 221, Friend 31 231, and Friend 41 241 are first-degree friends with Player 201 in his in-game social network 260. In some embodiments, it is possible for a friend to be in both the out-of-game social network 250 and the in-game social network 260. Here, Friend 21 221 has both an out-of-game connection 255 and an in-game connection 265 with Player 201, such that Friend 21 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend 22 222 had a direct in-game connection with Player 201, Friend 22 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Game Creation Module

This section describes various aspects of generating game invitations and creating new games, as implemented by the gaming networking system 120b. It is to be appreciated that the example embodiments described herein are provided merely for illustration and clarity of description. Consequently, the embodiments described here should not be interpreted as limiting the scope of other example embodiments that are consistent with this disclosure.

Figure 3:
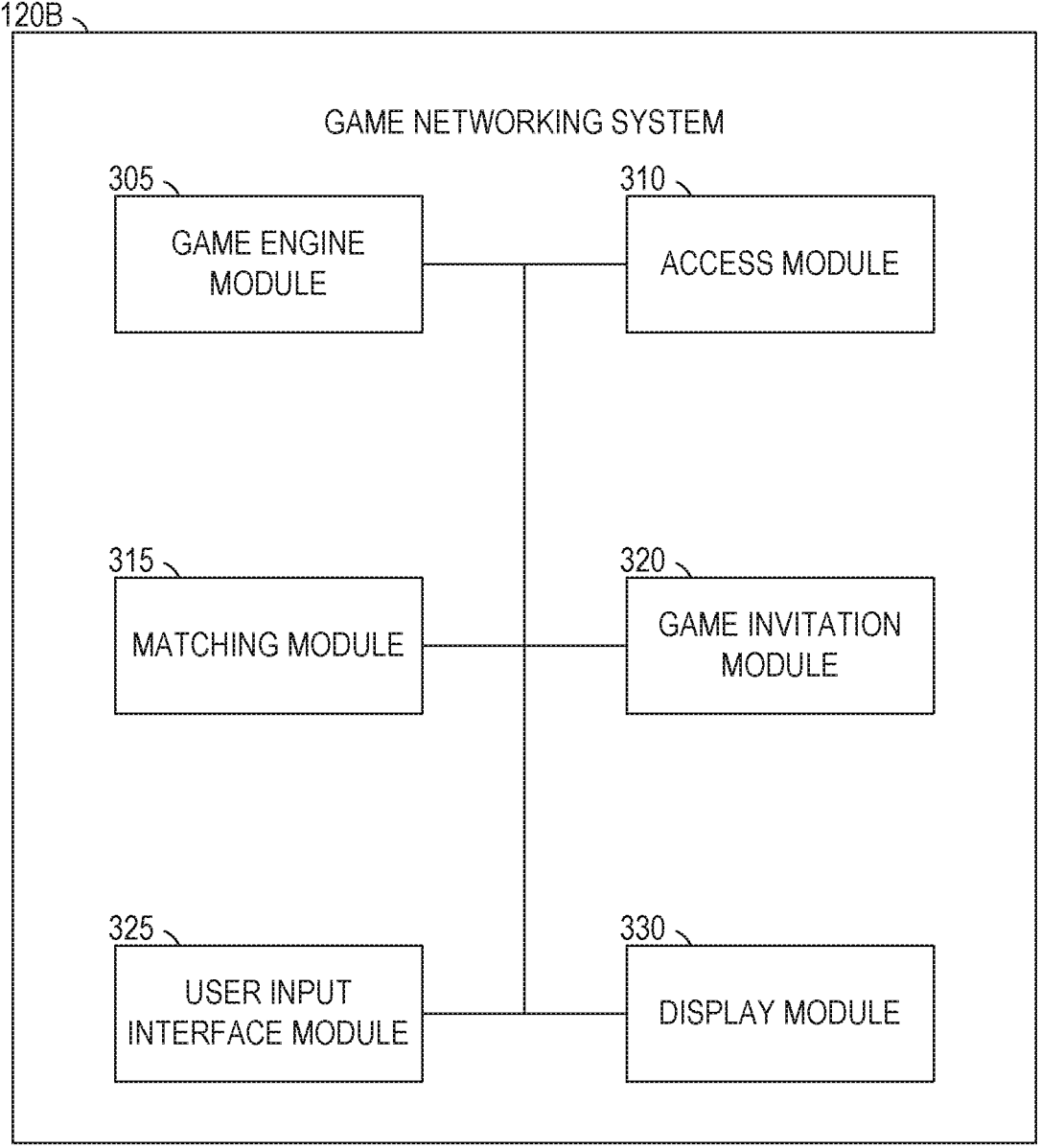
FIG. 3 is a block diagram illustrating components of a game networking system, according to some example embodiments.

FIG. 3 is a block diagram illustrating components of a game networking system, according to some example embodiments. The game networking system 120b may include a game engine module 305, an access module 310, a matching module 315, a game invitation module 320, a user input interface module 325, and a display module 330. All of the modules can be hardware-implemented modules configured to perform tasks described below.

In various example embodiments, the game engine module 305 is configured to manage and control any aspects of a game based on rules of the game, including how a game is played, players' actions and responses to players' actions, and the like. The game engine module 305 can be configured to generate a game instance of a game of a player and can determine the progression of a game based on user inputs and rules of the game.

In various example embodiments, the access module 310 is configured to access player information for a game. Player information can include the number of instances that a specific user plays a game, the number of game invitations sent to the user, the number of game invitations sent on behalf of the user, an association with another user (e.g., users have played each other), the number of game plays currently being played by the user, game status of the user (e.g., last time the user played the game), characteristics of the user playing the game (e.g., skill level, response rate to game invitations, response rate to turn notifications, response speed to turn notifications). Additionally, the access module 310 can access connection information associated with the player in a social network (e.g., Facebook account, Twitter account, and the like).

In various example embodiments, the matching module 315 is configured to determine whether two users (e.g., receiver and originator) have a connection. Additionally, the matching module 315 can determine (e.g., derive) information associated with the user based on the player information accessed by the access module 310. Furthermore, the matching module 315, in some embodiments, is configured to determine whether or not to send a game invitation to a receiver on behalf of the originator based on the determined information derived from the player information or the connection information. For instance, the matching module 315 may determine to send a game invitation to play a recipient game to a receiver on behalf of an originator based on the receiver and the originator having played each other in another game (e.g., initial game). The recipient game can be a game application that is installed on an originator's device, but not installed a receiver's device. The initial game can be another game application installed on both the originator's device and receiver's device.

In various example embodiments, the game invitation module 320 is configured to determine when game invitations are to be automatically generated for one or more players. Additionally, the game invitation module 320 is configured to generate the game invitation based on inputs by the matching module 315. Furthermore, the game invitation module 320 is configured to control and manage the automatic generation of these invitations, as described herein. In some instances, the game invitation module 320 detects when a game application is installed on a device of a user.

In various example embodiments, the user input interface module 325 is configured to receive user inputs for processing by the game engine module 305 based on rules of the game. For example, the user input interface module 325 can receive user inputs indicating functions, such as a selection and/or movement of a game object, a request received from the player, and the like.

In various example embodiments, the display module 330 is configured to control information or data that is provided to client systems for display on a client device. For example, the display module 330 can be configured to provide display data associated with displaying a game instance (e.g., game play) of a game, displaying a game user interface associated with one or more games, displaying game objects moved by a player, and the like. In some instances, the display module 330 displays the game invitation generated by the game invitation module 320 to a user (e.g., receiver). In some instances, when the receiver accepts the game invitation, the display module 330 displays a notification to the receiver to play his/her turn in the game instance. After the receiver plays his/her turn, the display module 330 displays a notification to the other user (e.g., originator) to play his/her turn in the game. For example, the display module 330 can display a game invitation of a particular game hosted by the game networking system 120b. As such, the display module 330 is further to cause display of a turn notification on a screen of a device in response to the user accepting the game invitation.

Figure 4:
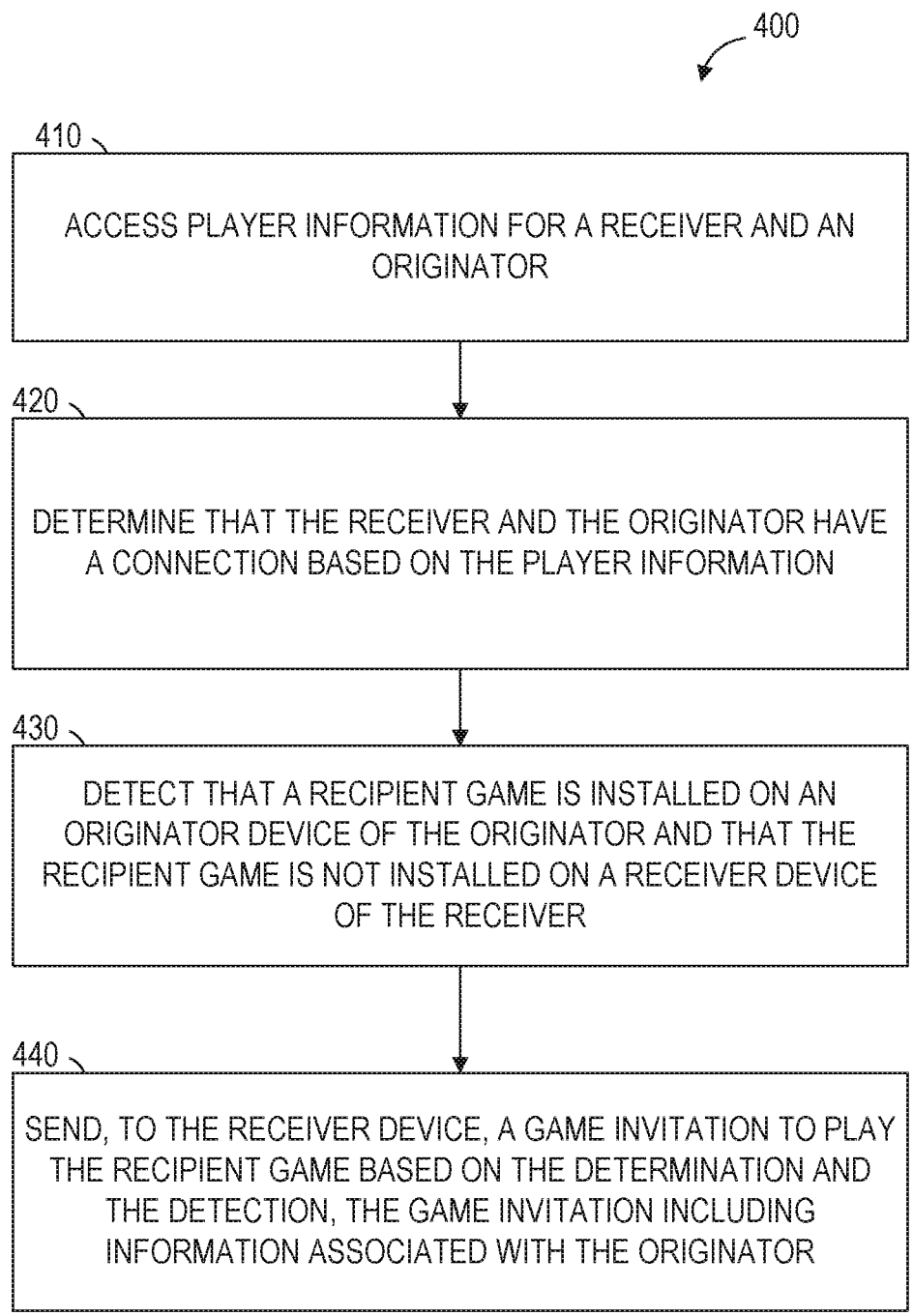
FIGS. 4-5 are flowcharts illustrating an example method of automatically sending a game invitation to a player, according to some example embodiments.

FIG. 4 is a flowchart illustrating an example method 400 of automatically sending a game invitation to a player, according to some example embodiments. As shown in FIG. 4, the method includes operations 410, 420, 430, and 440.

At operation 410, the access module 310 accesses player information for a receiver and an originator. The game invitation can be automatically generated by the game invitation module 320, and sent to the receiver on behalf of the originator. In some instances, the originator and the receiver are two players that have previously played each other in an initial game. The initial game can be another game hosted by the game networking system 120b.

At operation 420, the matching module 315 determines that the receiver and the originator have a connection based on the player information. The determination at operation 420 can be performed using one or more processors of the game networking system 120b. Alternatively, the determination at operation 420 can be performed using one or more processors of the client system 130.

In one example, the connection is that the receiver and the originator have played each other in an initial game. The initial game is different than the recipient game. For example, the initial game is Words with Friends™ (WWF), and the recipient game is Scrabble with Friends™ (SWF). Additionally, the connection can be that the receiver and the originator are connected in a social network. Furthermore, the connection can be that the receiver and the originator have similar characteristics (e.g., similar skill set, similar response rate to new game invitations, similar response timing to turn notifications) in another game application installed in both the originator device and the receiver device.

At operation 430, the game invitation module 320 detects whether a game application is installed on a device of a user. For example, the game invitation module 320 detects that a recipient game is installed on an originator device. The originator device can be a client device 130 of the originator. Additionally, the game invitation module 320 detects that the recipient game is not installed on a receiver device. The receiver device can be a client device 130 of the receiver.

Continuing with the example above, the game invitation module 320 detects that the recipient game (e.g., SWF) is installed in the originator device and is not installed in the receiver device. Additionally, operation 430 can also include the game invitation module 320 detecting that the initial game (e.g., WWF) is installed in both the originator device and the receiver device.

At operation 440, the game invitation module 320 sends a game invitation to play the recipient game based on the determination at operation 420 and the detection at operation 430. The game invitation can include information associated with the originator. For example, when the originator is named Bob, the game invitation can include a push notification with the following example text: "Bob wants to play a game with you, download the game now!"

In some instances, the game invitation can include a link to an application store to download a game application corresponding to the recipient game.

In some instances, the game invitation is sent to the receiver on behalf of the originator. For example, the game invitation is automatically generated by the game invitation module 320, and sent to the receiver by the game invitation module. The game invitation can include the name of the originator in the message to show that the game invitation is sent on behalf of the originator.

Figure 5:
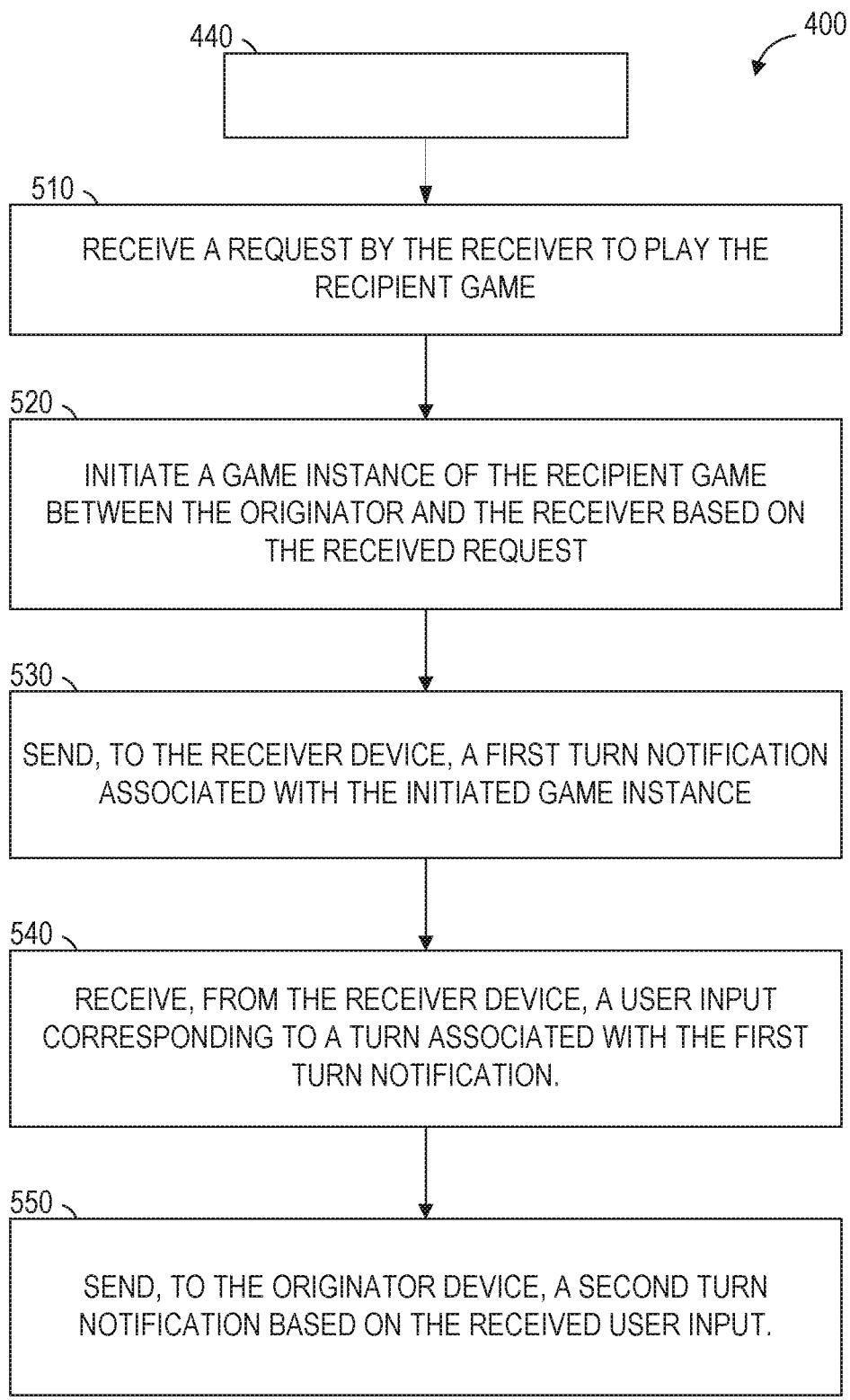

As shown in FIG. 5, the method 400 may include operations 510, 520, 530, 540, and 550. Moreover, the operations 510, 520, 530, 540, and 550, may each be performed after operation 440.

At operation 510, the game invitation module 320 receives a request by the receiver to play the recipient game. In some instances, the request can be based on a notification from an application store that a game application corresponding to the recipient game has been installed on the receiver device. In other instances, the request is received from the receiver device, such as the receiver sending a confirmation to play the recipient game in response to the receiver receiving the game invitation. For example, after receiving the game invitation at operation 440, the receiver can install the SWF game application.

At operation 520, the game invitation module 320 initiates a game instance of the recipient game between the originator and the receiver based on the received request. In some instances, the initiation of the game instance includes causing a presentation of the game instance on a display of the receiver device. Continuing with the example, the game invitation module 320 can automatically start a game instance in the SWF game application.

At operation 530, the game invitation module 320 sends, to the receiver device, a first turn notification associated with the initiated game instance. As previously described, a turn notification can be a push notification to the receiver device that prompts the receiver to play a first turn in the game instance of the recipient game. Continuing with the example, the game invitation module 320 can send a message to the receiver to play the first turn.

At operation 540, the user input interface module 325 receives, from the receiver device, a user input corresponding to a turn associated with the first turn notification. Continuing with the example, after receiving a turn notification, the receiver can place letter tiles on the digital game board of the SWF game.

At operation 550, the game invitation module 320 sends, to the originator device, a second turn notification based on the received user input. Continuing with the example, in response to receiving the user input at operation 540, the game invitation module 320 can sent a turn notification to the originator to play his/her turn in the game instance of the SWF game. The game invitation can display the game instance of the SWF game, which includes the turned played by receiver (e.g., letter tiles placed on the digital game board).

In some instances, after operation 550, the game engine module 305 and the access module 310 can update the player information to include that the receiver and the originator have played each other in the recipient game. The player information is utilized at operations 410, 420, and 430 by the matching module 315 to determine (e.g., match) an originator and a receiver.

The matching module 315 utilizes the player information to efficiently match an originator to a receiver based on parameters described below. Therefore, operation 420 can further include the matching module 315 matching an originator to a receiver based on the accessed player information.

For example, when the determined connection at operation 420 is that the receiver and the originator have played each other in an initial game, method 400 can further include the matching module 315 determining a number of game instances of the initial game that the receiver has played over a period of time. Additionally, the sending of the game invitation at operation 440 is further based on the determined number of game instances being above a predetermined threshold. For example, the game invitation is sent at operation 440 if the determined number of game instances is greater than one instance in a week.

In some instances, the matching module 315 determines a recipient game status of the originator, with the recipient game status corresponding to a time frame for a recent game instance of the recipient game. Additionally, the sending of the game invitation at operation 440 is further based on the determined recipient game status of the originator. For example, when the recipient game status is lapsed or heavily lapsed, the receiver can be determined to be a lapsed user based on the number of game instances of the initial game played by the receiver. For example, a lapsed user can be a user that has not played the initial game in the last seven days. A heavily lapsed user can be a user that has not played the initial game in the past month or year. The game invitation module 320 may not send a game invitation to a heavily lapsed user because the likelihood of the lapsed user installing the recipient game is low.

In some instances, the matching module 315 can match up a receiver that is a lapsed user with an originator that is an active user. An active user can be a user that has played the initial game with a predetermined (e.g., less than seven) number of days.

In some instances, the matching module 315 determines a number of game instances of the recipient game currently being played on the originator device. Additionally, the sending of the game invitation is further based on the determined number of game instances being below a predetermined threshold. For example, a game invitation is only send if the originator is currently playing less than a predetermined number (e.g., five) of game instances. The game invitation module 320 takes into account that the originator may not want to automatically start another game instance, when the originator already is playing numerous (e.g., more than five) game instances, so therefore the game invitation module 320 does not send a new game invitation to the receiver on behalf of the originator.

In some instances, the matching module 315 determines a number of game invitations having been sent to the receiver device over a predetermined amount of time. Additionally, the sending of the game invitation at operation 440 is further based on the determined number of game invitations being below a predetermined threshold.

In some instances, the matching module 315 determines a number of game invitations sent on behalf of the originator. Additionally, the sending of the game invitation at operation 440 is further based on the determined number of game invitations sent on behalf of the originator. The game invitation module 320 takes into account that the originator may not want to be bothered by too many new game instances automatically started on the behalf of the originator. Therefore, when the determined number of game invitations sent on behalf of the originator is above a threshold (e.g., more than five), then the game invitation module 320 does not send a new game invitation to the receiver on behalf of the originator.

Figure 6:
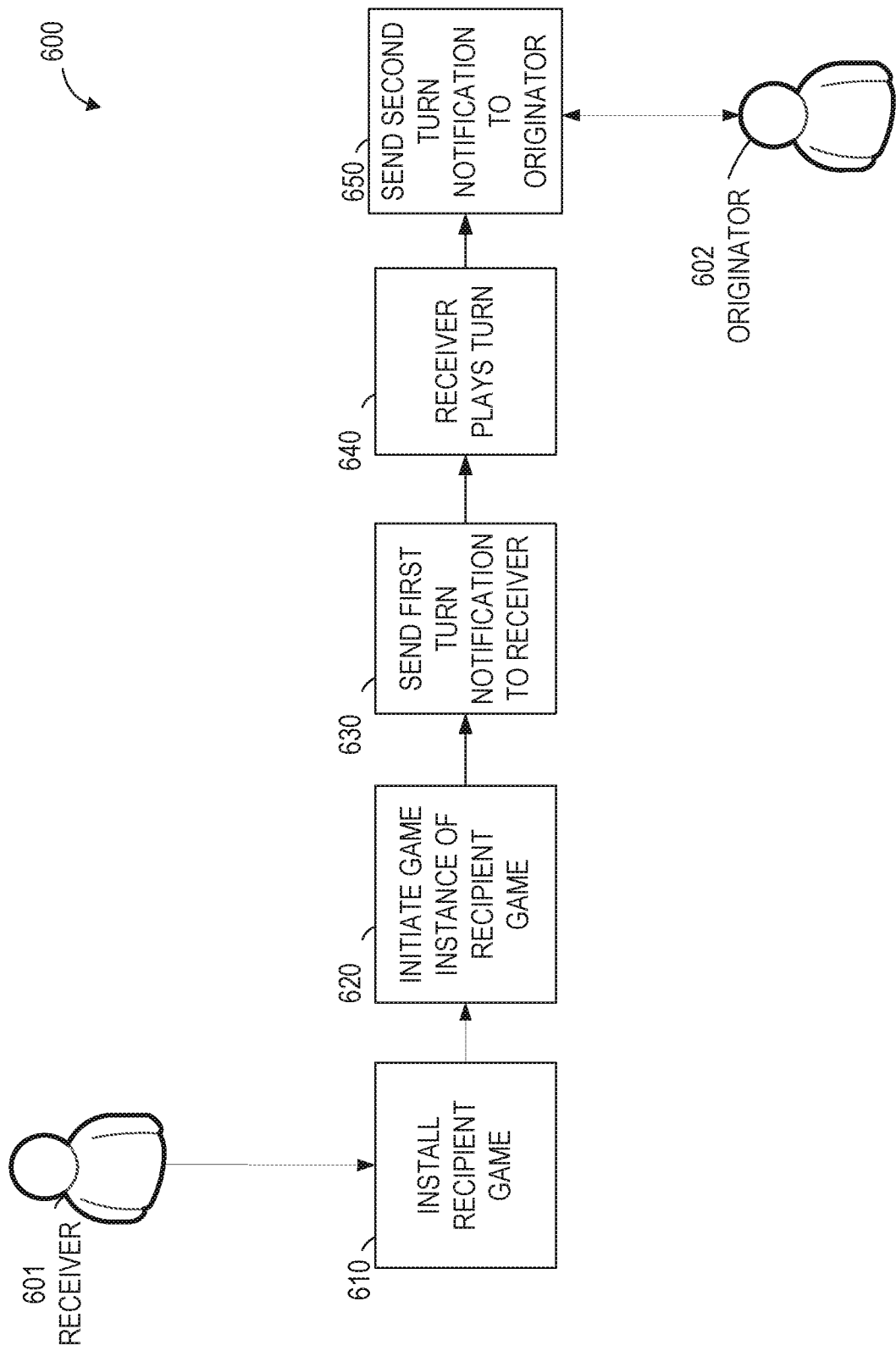
FIG. 6 is a flowchart illustrating an example method of automatically sending a turn notification after a receiver has installed a recipient game, according to some example embodiments.

FIG. 6 is a flowchart illustrating an example method 600 of automatically sending a turn notification after a receiver 601 has installed a recipient game in response to a game invitation received on behalf on an originator 602, according to some example embodiments. As shown in FIG. 6, the method includes operations 610, 620, 630, 640, and 650.

At operation 610, the receiver 601 installs a recipient game in response to a game invitation received on behalf on an originator 602. The game invitation can be sent using operation 440 of method 400.

At operation 620, the game invitation module 320 initiates a game instance of the recipient game between the receiver 601 and the originator 602.

At operation 630, the game invitation module 320 sends a first turn notification to the receiver 601. In some instances, the originator 602 does not get a notification that the game instance has started or get a turn notification.

At operation 640, the receiver 601 plays his/her turn in response to the received first turn notification. The user input interface 325 can receive a user input from the receiver 601 corresponding to the played turn.

At operation 650, after the game engine module 305 determines that the receiver 601 has played his/her turn, the game invitation module 320 now sends a second turn notification to the originator 602. Subsequently, the rest of the game can proceed as normal.

Figure 7:
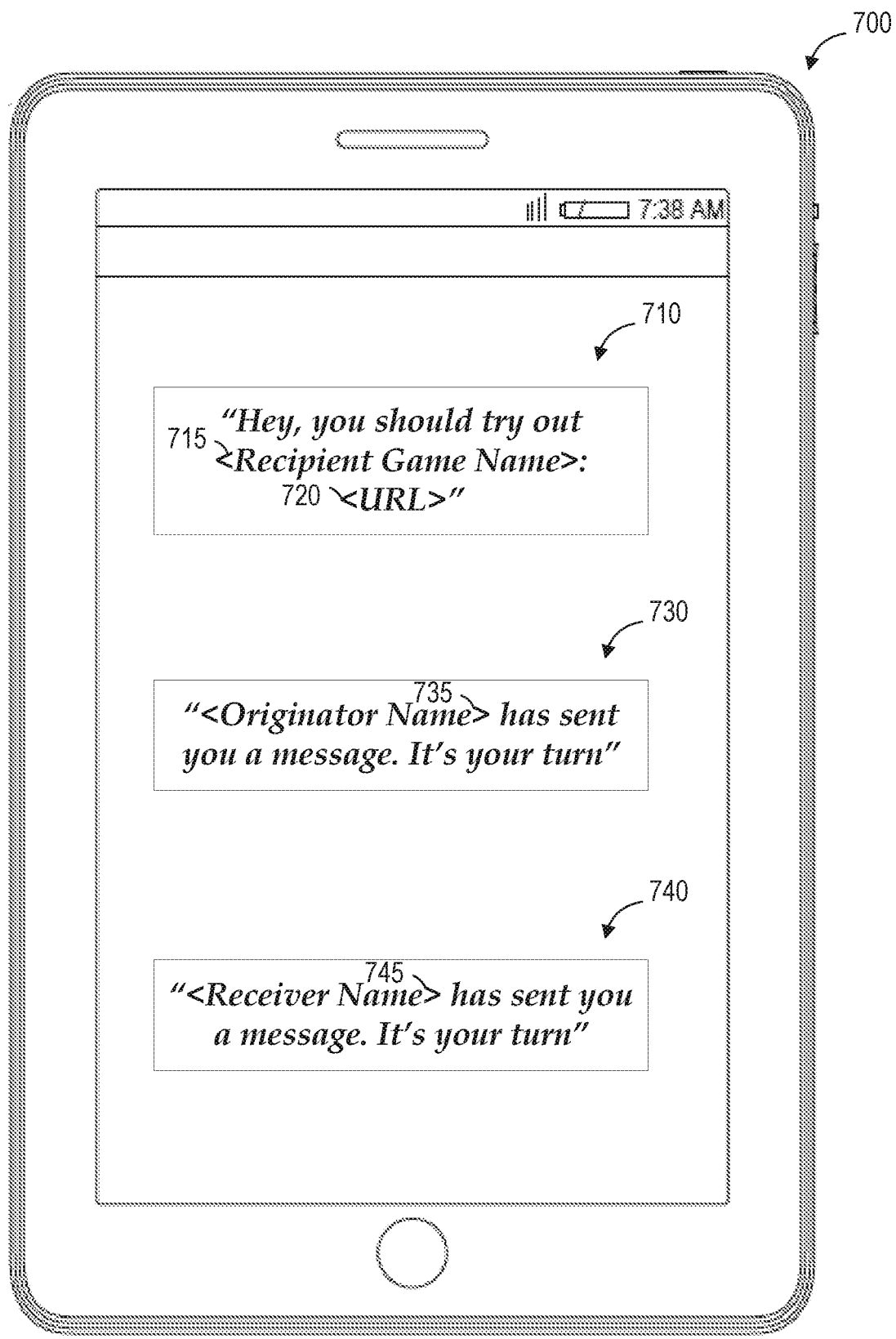
FIG. 7 is a diagram that depicts an example user interface, according to some example embodiments.

FIG. 7 is a diagram that depicts an example user interface 700, according to some example embodiments. The example user interface 700 may be displayed on a device (e.g., client device 130) that is operated by a player of the multiplayer game. As shown, FIG. 7 includes a game invitation 710. The game invitation includes the name of the recipient game 715 and a link to the application store to download the recipient game application. The link can be a uniform resource locator (URL) 720.

Additionally, the user interface 700 can include a first turn notification 730. The first turn notification can include the originator name 735.

Furthermore, the user interface 700 can include a second turn notification 740. The first turn notification can include the receiver name 745.

Moreover, the user interface may be presented by the display module 330 on the client device 130.

Data Flow

Figure 8:
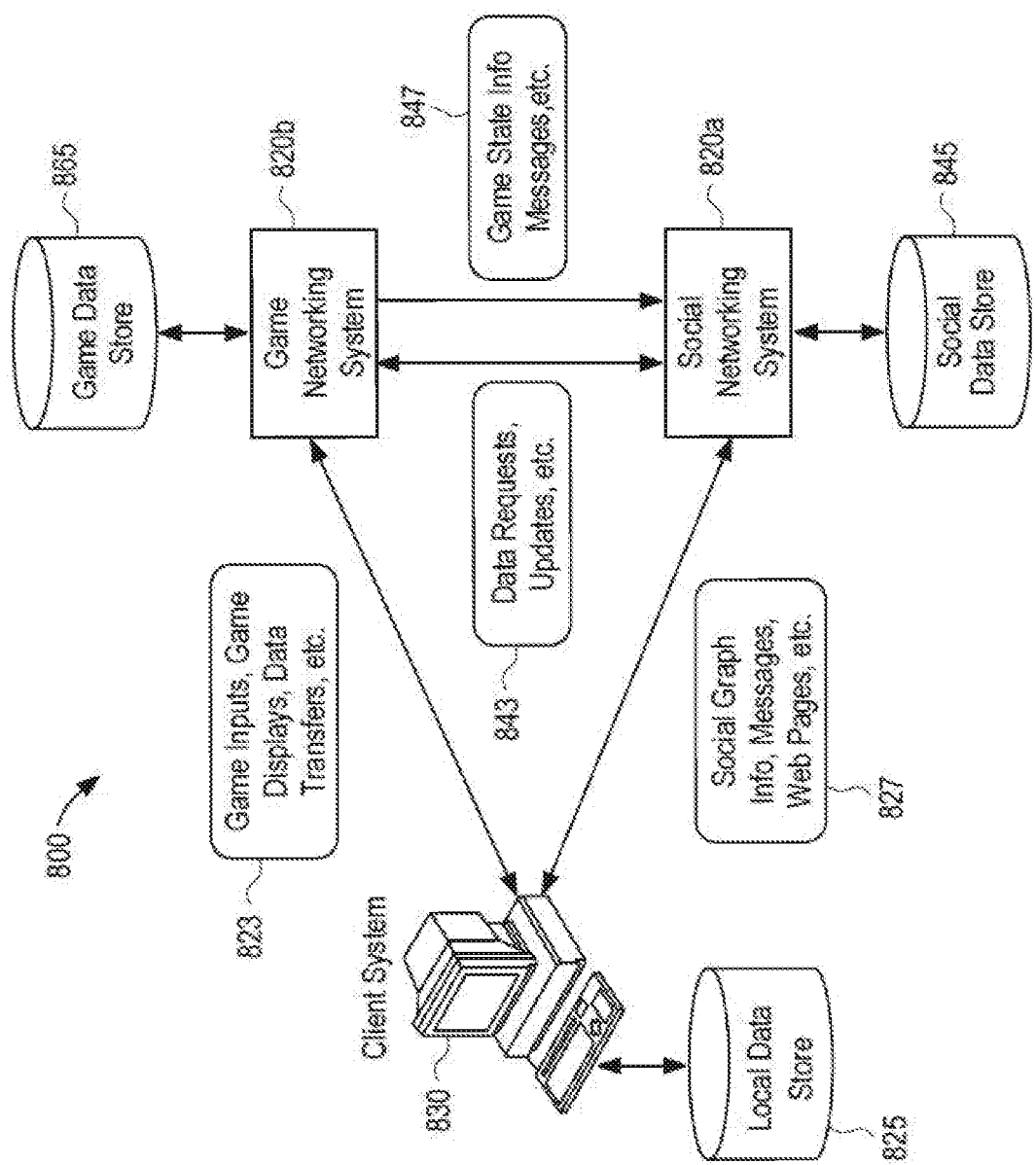
FIG. 8 is a diagrammatic representation of an example data flow between example components of the example system of FIG. 1, according to some example embodiments.

FIG. 8 illustrates an example data flow between the components of system 800. In particular embodiments, system 800 can include client system 830, social networking system 820a, and game networking system 820b. The components of system 800 can be connected to each other in any suitable configuration, using any suitable type of connection. The components may be connected directly or over any suitable network. Client system 830, social networking system 820a, and game networking system 820b can each have one or more corresponding data stores such as local data store 825, social data store 845, and game data store 865, respectively. Social networking system 820a and game networking system 820b can also have one or more servers that can communicate with client system 830 over an appropriate network. Social networking system 820a and game networking system 820b can have, for example, one or more internet servers for communicating with client system 830 via the Internet. Similarly, social networking system 820a and game networking system 820b can have one or more mobile servers for communicating with client system 830 via a mobile network (e.g., GSM, PCS, Wi-Fi, WPAN, etc.). In some embodiments, one server may be able to communicate with client system 830 over both the Internet and a mobile network. In other embodiments, separate servers can be used.

Client system 830 can receive and transmit data 823 to and from game networking system 820b. This data can include, for example, webpages, messages, game inputs, game displays, HTTP packets, data requests, transaction information, updates, and other suitable data. At some other time, or at the same time, game networking system 820b can communicate data 843, 847 (e.g., game state information, game system account information, page info, messages, data requests, updates, etc.) with other networking systems, such as social networking system 820a (e.g., Facebook, Myspace, etc.). Client system 830 can also receive and transmit data 827 to and from social networking system 820a. This data can include, for example, webpages, messages, social graph information, social network displays, HTTP packets, data requests, transaction information, updates, and other suitable data.

Communication between client system 830, social networking system 820a, and game networking system 820b can occur over any appropriate electronic communication medium or network using any suitable communications protocols. For example, client system 830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TEL-NET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as WL, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 820*b*, the BLOB containing the game state for the instance corresponding to the player can be transmitted to client system 830 for use by a client-side executed object to process. In particular embodiments, the client-side executable may be a FLASH-based game, which can de-serialize the game state data in the BLOB. As a player plays the game, the game logic implemented at client system 830 maintains and modifies the various game state parameters locally. The client-side game logic may also batch game events, such as mouse clicks, and transmit these events to game networking system 820*b*. Game networking system 820*b* may itself operate by retrieving a copy of the BLOB from a database or an intermediate memory cache (memcache) layer. Game networking system 820*b* can also de-serialize the BLOB to resolve the game state parameters and execute its own game logic based on the events in the batch file of events transmitted by the client to synchronize the game state on the server side. Game networking system 820*b* may then re-serialize the game state, now modified, into a BLOB and pass this to a memory cache layer for lazy updates to a persistent database.

With a client-server environment in which the online games may run, one server system, such as game networking system 820*b*, may support multiple client systems 830. At any given time, there may be multiple players at multiple client systems 830 all playing the same online game. In practice, the number of players playing the same game at the same time may be very large. As the game progresses with each player, multiple players may provide different inputs to the online game at their respective client systems 830, and multiple client systems 830 may transmit multiple player inputs and/or game events to game networking system 820*b* for further processing. In addition, multiple client systems 830 may transmit other types of application data to game networking system 820*b*.

In particular embodiments, a computed-implemented game may be a text-based or turn-based game implemented as a series of web pages that are generated after a player selects one or more actions to perform. The web pages may be displayed in a browser client executed on client system 830. As an example and not by way of limitation, a client application downloaded to client system 830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 820*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 830, either caused by an action of a game player or by the game logic itself, client system 830 may need to inform game networking system 820*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 800 is discussed in reference to updating a multi-player online game hosted on a network-addressable system (such as, for example, social networking system 820*a* or game networking system 820*b*), where an instance of the online game is executed remotely on a client system 830, which then transmits application event data to the hosting system such that the remote game server synchronizes game state associated with the instance executed by the client system 830.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 830 may include a Flash client. The Flash client may be configured to receive and run Flash application or game object code from any suitable networking system (such as, for example, social networking system 820*a* or game networking system 820*b*). In particular embodiments, the Flash client may be run in a browser client executed on client system 830. A player can interact with Flash objects using client system 830 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 830, the Flash client may send the events that caused the game state changes to the in-game object to game networking system 820*b*. However, to expedite the processing and hence the speed of the overall gaming experience, the Flash client may collect a batch of some number of events or updates into a batch file. The number of events or updates may be determined by the Flash client dynamically or determined by game networking system 820*b* based on server loads or other factors. For example, client system 830 may send a batch file to game networking system 820*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 830. In particular embodiments, the batch file may be a text file and the name-value pairs may be in string format.

In particular embodiments, when a player plays an online game on client system 830, game networking system 820*b* may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 820*b* may retrieve the corresponding BLOB from the database to determine the most-recent values of the game-related data. In particular embodiments, while a player is playing the online game, game networking system 820*b* may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 9:
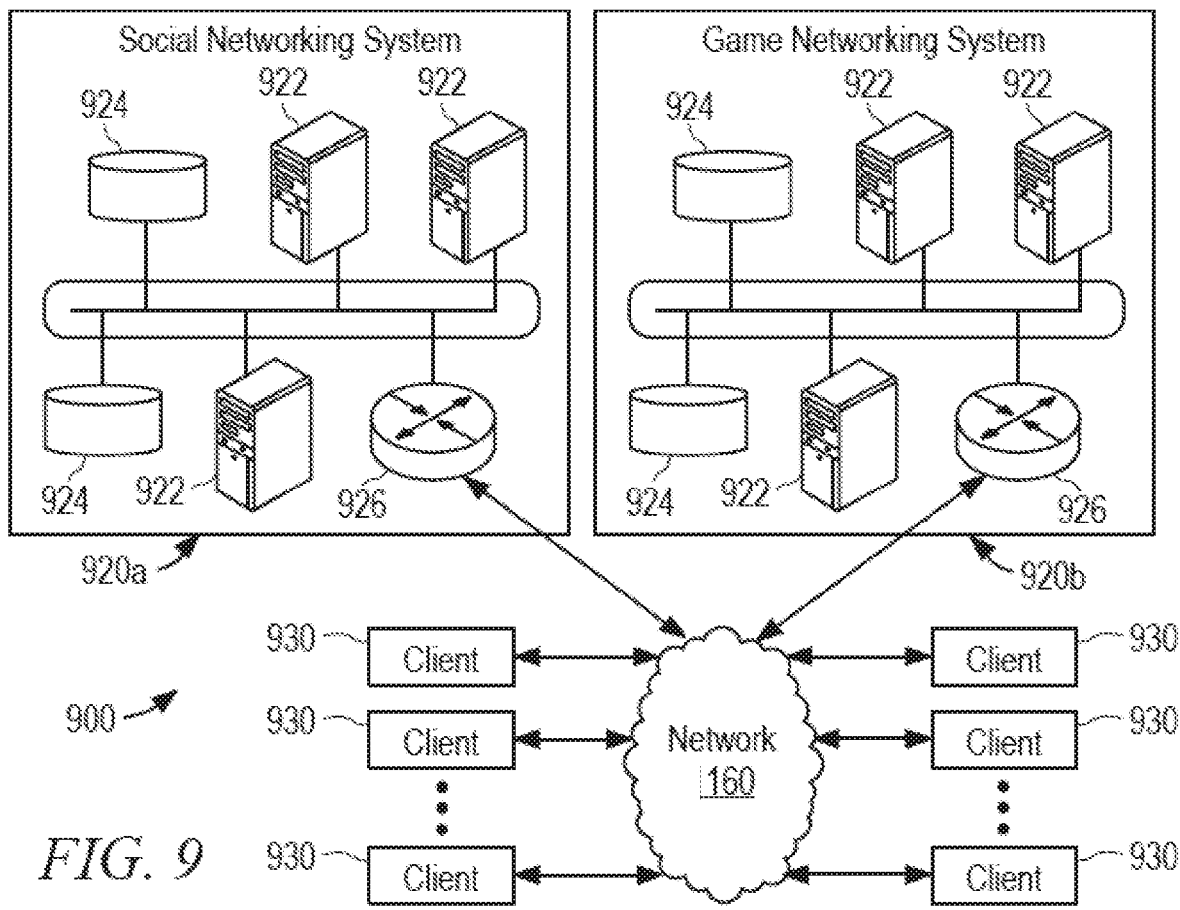
FIGS. 9-10 are schematic diagrams showing an example network environment, in which various example embodiments may operate, according to some example embodiments.

Particular embodiments may operate in a wide area network environment, such as the Internet, including multiple network addressable systems. FIG. 9 illustrates an example network environment, in which various example embodiments may operate. Network cloud 960 generally represents one or more interconnected networks, over which the systems and hosts described herein can communicate. Network cloud 960 may include packet-based wide area networks (such as the Internet), private networks, wireless networks, satellite networks, cellular networks, paging networks, and the like. As FIG. 9 illustrates, particular embodiments may operate in a network environment comprising one or more networking systems, such as social networking system 920*a*, game networking system 920*b*, and one or more client systems 930. The components of social networking system 920*a* and game networking system 920*b* operate analogously; as such, hereinafter they may be referred to simply at networking system 920. Client systems 930 are operably connected to the network environment via a network service provider, a wireless carrier, or any other suitable means.

Networking system 920 is a network addressable system that, in various example embodiments, comprises one or more physical servers 922 and data stores 924. The one or more physical servers 922 are operably connected to computer network 960 via, by way of example, a set of routers and/or networking switches 926. In an example embodiment, the functionality hosted by the one or more physical servers 922 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 922 may host functionality directed to the operations of networking system 920. Hereinafter servers 922 may be referred to as server 922, although server 922 may include numerous servers hosting, for example, networking system 920, as well as other content distribution servers, data stores, and databases. Data store 924 may store content and data relating to, and enabling, operation of networking system 920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 924 corresponds to one or more of a variety of separate and integrated databases, such as relational databases and object-oriented databases, that maintain information as an integrated collection of logically related records or files stored on one or more physical systems. Structurally, data store 924 may generally include one or more of a large class of data storage and management systems. In particular embodiments, data store 924 may be implemented by any suitable physical system(s) including components, such as one or more database servers, mass storage media, media library systems, storage area networks, data storage clouds, and the like. In one example embodiment, data store 924 includes one or more servers, databases (e.g., MySQL), and/or data warehouses. Data store 924 may include data associated with different networking system 920 users and/or client systems 930.

Client system 930 is generally a computer or computing device including functionality for communicating (e.g., remotely) over a computer network. Client system 930 may be a desktop computer, laptop computer, personal digital assistant (PDA), in- or out-of-car navigation system, smart phone or other cellular or mobile phone, or mobile gaming device, among other suitable computing devices. Client system 930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 930 to enter addresses of specific network resources to be retrieved, such as resources hosted by networking system 920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CS S), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 930 desires to view a particular webpage (hereinafter also referred to as target structured document) hosted by networking system 920, the user's web browser, or other document rendering engine or suitable client application, formulates and transmits a request to networking system 920. The request generally includes a URL or other document identifier as well as metadata or other information. By way of example, the request may include information identifying the user, such as a user ID, as well as information identifying or characterizing the web browser or operating system running on the user's client computing device 930. The request may also include location information identifying a geographic location of the user's client system or a logical network location of the user's client system. The request may also include a timestamp identifying when the request was transmitted.

Although the example network environment described above and illustrated in FIG. 9 described with respect to social networking system 920a and game networking system 920b, this disclosure encompasses any suitable network environment using any suitable systems. As an example and not by way of limitation, the network environment may include online media systems, online reviewing systems, online search engines, online advertising systems, or any combination of two or more such systems.

Figure 10:
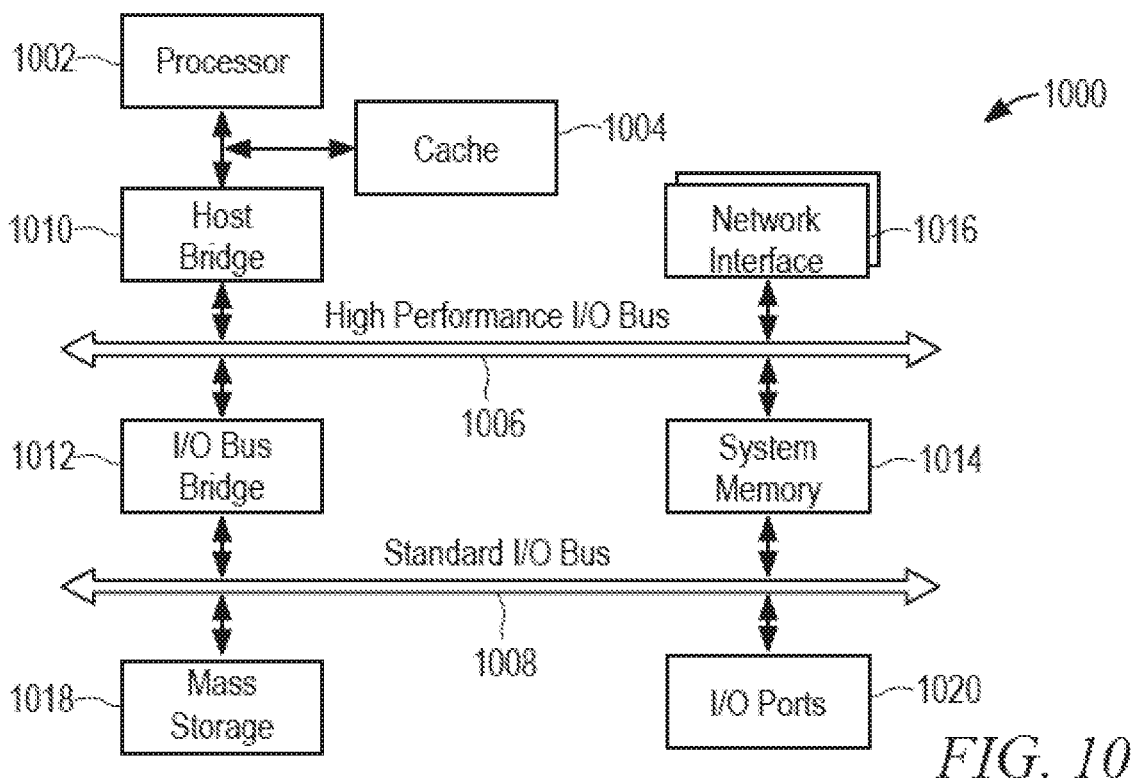

FIG. 10 illustrates an example computing system architecture, which may be used to implement a server 922 or a client system 930. In one embodiment, hardware system 1000 comprises a processor 1002, a cache memory 1004, and one or more executable modules and drivers, stored on a tangible computer readable medium, directed to the functions described herein. Additionally, hardware system 1000 may include a high performance input/output (I/O) bus 1006 and a standard I/O bus 1008. A host bridge 1010 may couple processor 1002 to high performance I/O bus 1006, whereas I/O bus bridge 1012 couples the two buses 1006 and 1008 to each other. A system memory 1014 and one or more network/communication interfaces 1016 may couple to bus 1006. Hardware system 1000 may further include video memory (not shown) and a display device coupled to the video memory. Mass storage 1018 and I/O ports 1020 may couple to bus 1008. Hardware system 1000 may optionally include a keyboard, a pointing device, and a display device (not shown) coupled to bus 1008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1000 are described in greater detail below. In particular, network interface 1016 provides communication between hardware system 1000 and any of a wide range of networks, such as an Ethernet (e.g., IEEE 802.3) network, a backplane, etc. Mass storage 1018 provides permanent storage for the data and programming instructions to perform the above-described functions implemented in servers 422, whereas system memory 1014 (e.g., DRAM) provides temporary storage for the data and programming instructions when executed by processor 1002. I/O ports 1020 are one or more serial and/or parallel communication ports that provide communication between additional peripheral devices, which may be coupled to hardware system 1000.

Hardware system 1000 may include a variety of system architectures and various components of hardware system 1000 may be rearranged. For example, cache 1004 may be on-chip with processor 1002. Alternatively, cache 1004 and processor 1002 may be packed together as a "processor module," with processor 1002 being referred to as the "processor core." Furthermore, certain embodiments of the present disclosure may not require nor include all of the above components. For example, the peripheral devices shown coupled to standard I/O bus 1008 may couple to high performance I/O bus 1006. In addition, in some embodiments, only a single bus may exist, with the components of hardware system 1000 being coupled to the single bus. Furthermore, hardware system 1000 may include additional components, such as additional processors, storage devices, or memories.

An operating system manages and controls the operation of hardware system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a," "an," or "the" is intended to mean "one or more" unless specifically indicated to the contrary. In addition, it is to be understood that functional operations, such as "awarding," "locating," "permitting," and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A system comprising:
    one or more computer processor devices; and
    memory storing instructions that, when executed by the one or more computer processor devices, configure the system to perform operations comprising:
        accessing player information for players of a multi-player online game managed over a distributed computer network by the system;
        processing the player information to identify one of the players as a recruiting player for the game, the recruiting player having an associated user device on which is installed a client game application executable by the user device to enable playing of the game via the user device;
        identifying as a target recruit a user who satisfies predefined connection criteria with respect to the recruiting player, the target recruit having a respectively associated user device capable of executing the client game application;
        establishing absence of installation of the client game application on the user device of the target recruit; and
        responsive to and conditional upon establishing the absence of installation of the client game application on the user device of the target recruit, generating and transmitting to the user device of the target recruit, without involvement of or initiation by the recruiting player, a game invitation for the recruiting player and the target recruit to play an instance of the game together, the game invitation being configured to appear as having been initiated by the recruiting player.

2. The system of claim 1, wherein the instructions configure the system to transmit the game invitation to the target recruit on behalf of the recruiting player.

3. The system of claim 1, wherein the instructions further configure the system to:
    responsive to acceptance of the game invitation by the target recruit, automatically cause installation of the client game application for the game on the user device of the target recruit.

4. The system of claim 1, wherein the game invitation includes a selectable link to an application store to download the client game application for the target game to the user device of the target recruit.

5. The system of claim 4, wherein the instructions further configure the system to:
    receive a notification from the application store that the client game application for the game has been installed on the user device of the target recruit;
    responsive to receiving the notification from the application store, automatically generate and transmit a request from the target recruit for gameplay with the recruiting player; and
    based on the request, initiate a game instance of the game between the recruiting player and the target recruit.

6. The system of claim 1, wherein the connection criteria comprise that the target recruit and the recruiting player are connected in a social network.

7. The system of claim 6, wherein the social network is an out-of-game network.

8. The system of claim 1, wherein the connection criteria comprise that the target recruit and the recruiting player have played each other in a further game hosted by the system, the further game being different from the game to which the game invitation pertains.

9. The system of claim 8, wherein the instructions further configure the system to:
quantify a number of game instances of the further game that the target recruit has played over a predefined period of time; and
wherein the generation and transmission of the game invitation is further conditional upon the number of game instances transgressing a predetermined threshold.

10. A method comprising:
accessing player information for players of a multiplayer online game managed over a distributed computer network by a gaming server system comprising one or more game servers;
processing the player information to identify one of the players as a recruiting player for the game, the recruiting player having an associated user device on which is installed a client game application executable by the user device to enable playing of the game via the user device;
in an automated operation performed one or more computer processor devices configured therefor, identifying as a target recruit a user who satisfies predefined connection criteria with respect to the recruiting player, the target recruit having a respectively associated user device capable of executing the client game application;
establishing absence of installation of the client game application on the user device of the target recruit; and
in an automated procedure performed responsive to and conditional upon establishing the absence of installation of the client game application on the user device of the target recruit, generating and transmitting to the user device of the target recruit, without involvement of or initiation by the recruiting player, a game invitation for the recruiting player and the target recruit to play an instance of the game together, the game invitation being configured to appear as having been initiated by the recruiting player.

11. The method of claim 10, wherein the gaming server system transmits the game invitation to the target recruit on behalf of the recruiting player.

12. The method of claim 10, further comprising:
responsive to acceptance of the game invitation by the target recruit, automatically causing, by operation of the gaming server system, installation of the client game application for the game on the user device of the target recruit.

13. The method of claim 10, wherein the game invitation includes a selectable link to an application store to download the client game application for the target game to the user device of the target recruit.

14. The method of claim 13, further comprising:
receiving a notification from the application store that the client game application for the game has been installed on the user device of the target recruit;
responsive to receiving the notification from the application store, automatically generating and transmitting a request from the target recruit for gameplay with the recruiting player; and
based on the request; initiating a game instance of the game between the recruiting player and the target recruit.

15. The method of claim 10, wherein the connection criteria comprise that the target recruit and the recruiting player are connected in a social network.

16. The method of claim 15, wherein the social network is an out-of-game network.

17. The method of claim 10, wherein the connection criteria comprise that the target recruit and the recruiting player have played each other in a further game hosted by the gaming server system, the further game being different from the game to which the game invitation pertains.

18. The method of claim 17, further comprising:
quantifying a number of game instances of the further game that the target recruit has played over a predefined period of time; and
wherein the generation and transmission of the game invitation is further conditional upon the number of game instances transgressing a predetermined threshold.

19. A non-transitory computer-readable storage medium, the computer-readable storage medium including instructions that when executed by a computer, cause the computer to perform operation comprising:
accessing player information for players of a multiplayer online game managed over a distributed computer network by a gaming server system comprising one or more game servers;
processing the player information to identify one of the players as a recruiting player for the game, the recruiting player having an associated user device on which is installed a client game application executable by the user device to enable playing of the game via the user device;
identifying as a target recruit a user who satisfies predefined connection criteria with respect to the recruiting player, the target recruit having a respectively associated user device capable of executing the client game application;
establishing absence of installation of the client game application on the user device of the target recruit; and
responsive to and conditional upon establishing the absence of installation of the client game application on the user device of the target recruit, generating and transmitting to the user device of the target recruit, without involvement of or initiation by the recruiting player, a game invitation for the recruiting player and the target recruit to play an instance of the game together, the game invitation being configured to appear as having been initiated by the recruiting player.

20. The computer-readable storage medium of claim 19, wherein the instructions cause the gaming server system to transmit the game invitation to the target recruit on behalf of the recruiting player.

* * * * *

UNITED STATES PATENT AND TRADEMARK OFFICE
CERTIFICATE OF CORRECTION

PATENT NO. : 11,192,023 B2
APPLICATION NO. : 16/834629
DATED : December 7, 2021
INVENTOR(S) : Agrawal et al.

Page 1 of 2

It is certified that error appears in the above-identified patent and that said Letters Patent is hereby corrected as shown below:

In the Specification

In Column 8, Line 20, delete "12" and insert --$1_z$-- therefor

In Column 8, Line 20, delete "22" and insert --$2_z$-- therefor

In Column 8, Line 21, delete "11" and insert --$i_1$-- therefor

In Column 8, Line 30, delete "32" and insert --$3_r$-- therefor

In Column 8, Line 42, delete "11" and insert --$i_1$-- therefor

In Column 8, Line 42, delete "21" and insert --$2_1$-- therefor

In Column 8, Line 46, delete "21" and insert --$2_1$-- therefor

In Column 8, Line 46, delete "31" and insert --$3_1$-- therefor

In Column 8, Line 46, delete "41" and insert --$4_1$-- therefor

In Column 8, Line 50, delete "21" and insert --$2_1$-- therefor

In Column 8, Line 52, delete "21" and insert --$2_1$-- therefor

In Column 8, Line 61, delete "22" and insert --$2_r$-- therefor

In Column 8, Line 62, delete "22" and insert --$2_r$-- therefor

In Column 10, Line 56, after "120b", insert --.--

Signed and Sealed this
Thirteenth Day of December, 2022

*Katherine Kelly Vidal*

Katherine Kelly Vidal
*Director of the United States Patent and Trademark Office*

CERTIFICATE OF CORRECTION (continued)
U.S. Pat. No. 11,192,023 B2

In Column 15, Line 8, delete "WL," and insert --XML,-- therefor

In Column 19, Line 39, delete "(CS S)," and insert --(CSS),-- therefor

In the Claims

In Column 24, Line 5, in Claim 14, delete "request;" and insert --request,-- therefor